(12) United States Patent
Kobayashi

(10) Patent No.: US 6,219,322 B1
(45) Date of Patent: Apr. 17, 2001

(54) OPTICAL INFORMATION RECORDING APPARATUS, OPTICAL INFORMATION RECORDING METHOD, OPTICAL INFORMATION RECORDING MEDIUM AND OPTICAL INFORMATION REPRODUCING APPARATUS

(75) Inventor: Seiji Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/174,954

(22) Filed: Oct. 19, 1998

(30) Foreign Application Priority Data

Oct. 21, 1997 (JP) .............................................. P09-288960

(51) Int. Cl.⁷ ...................................................... G11B 7/00
(52) U.S. Cl. .................................. 369/59; 369/48; 369/54
(58) Field of Search .................................. 369/47, 48, 49, 369/50, 54, 58, 59, 116

(56) References Cited

U.S. PATENT DOCUMENTS 5,189,657 * 2/1993 Lee ......................................... 369/59

* cited by examiner

Primary Examiner—Muhammad Edun
(74) Attorney, Agent, or Firm—Frommer Lawrence & Haug, LLP; William S. Frommer

(57) ABSTRACT

An identification code that may be read out by a reproducing apparatus and which may not spoil ordinary user information is recorded on an optical information recording medium. An optical information recording apparatus (1) for recording digital information on an optical information recording medium (2) by modulating recording light (L) irradiated on the optical information recording medium (2) comprises a first modulation signal generating element (13) for generating a first modulation signal (S2) by switching a signal level at an integral multiple period of a predetermined fundamental period in response to first digital information (D1), a second modulating element (57) for generating a double modulation signal (SC) by further modulating the first modulation signal (S2) in response to second digital information SC1 other than the first digital information D1 and a recording light modulating element (8) for modulating recording light (L) in accordance with the double modulation signal (SC).

19 Claims, 8 Drawing Sheets

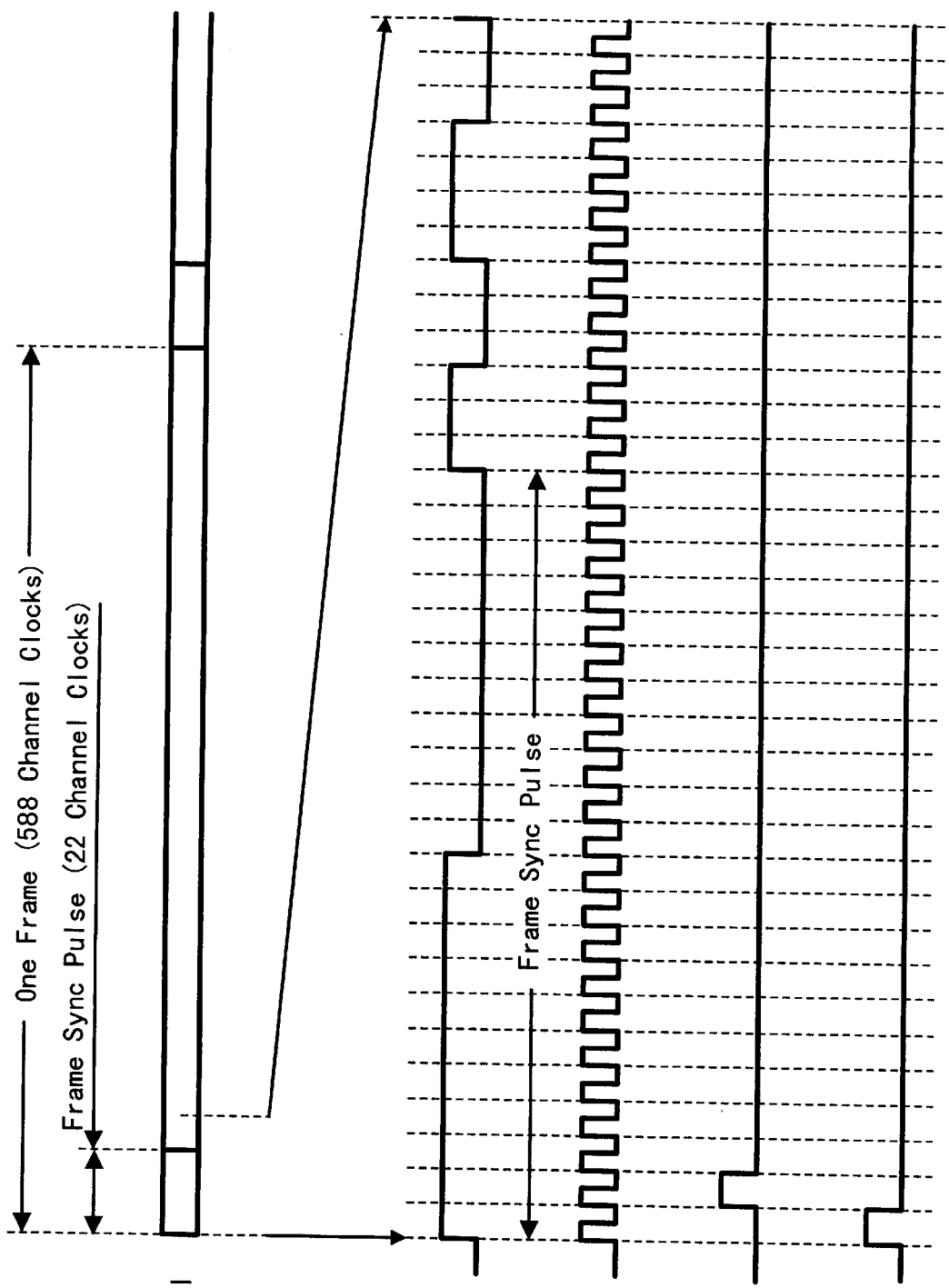

OPTICAL INFORMATION RECORDING APPARATUS, OPTICAL INFORMATION RECORDING METHOD, OPTICAL INFORMATION RECORDING MEDIUM AND OPTICAL INFORMATION REPRODUCING APPARATUS

BACKGROUND OF THE INVENTION

1. Field of the Invention

The present invention relates to an optical information recording apparatus, an optical information recording method, an optical information recording medium and optical information reproducing apparatus which may be applied to a recording apparatus and a recording method for use in making an optical disc such as a compact disc (CD), an optical disc such as a compact disc and an optical disc reproducing apparatus such as a compact disc player, for example.

2. Description of the Related Art

In a compact disc which is a kind of optical information recording media, in order to identify a disc, codes representing a maker, a factory, a disc No. or the like are stamped on the inside of the area in which ordinary user information such as an audio signal and TOC (Table of Contents) are recorded. Also, there is proposed a method of recording such an identification code on a signal recording area as a pattern that can be confirmed visually.

The identification codes representing a maker, a factory, a disc No. and the like that are recorded by these methods can be visually recognized and cannot be read out by a reproducing apparatus such as a compact disc player. There is then the problem that contents of these identification codes cannot be reflected on controlling an operation of the reproducing apparatus (e.g. the reproduction of an audio signal from a compact disc produced by an illegal copy cannot be stopped).

SUMMARY OF THE INVENTION

In view of the aforesaid aspect, it is an object of the present invention to provide an optical information recording apparatus and an optical information recording method in which identification codes that can be read out by a reproducing apparatus and which may not spoil ordinary user information may be recorded on an optical information recording medium together with ordinary information, an optical information recording medium in which such identification codes are recorded together with ordinary information and an optical information reproducing apparatus for reproducing the identification code from such optical information recording medium together with ordinary information.

According to a first aspect of the present invention, there is provided an optical information recording apparatus for recording digital information on an optical information recording medium by modulating recording light irradiated on the optical information recording medium. This optical information recording apparatus comprises a first modulation signal generating circuit for generating a first modulation signal by switching a signal level at an integral multiple period of a predetermined fundamental period in response to first digital information, a second modulating circuit for generating a double modulation signal by further modulating the first modulation signal in response to second digital information other than the first digital information, and a recording light modulating circuit for modulating the recording light in accordance with the double modulation signal.

According to a second aspect of the present invention, there is provided an optical information recording method of recording digital information on an optical information recording medium by modulating recording light irradiated on the optical information recording medium. This optical information recording method comprises the steps of generating a first modulation signal by switching a signal level at an integral multiple period of a predetermined fundamental period in response to first digital information, generating a double modulation signal by modulating a timing at which a level of the first modulation signal is changed in response to second digital information other than the first digital information, and modulating the recording light in accordance with the double modulation signal.

In accordance with a third aspect of the present invention, there is provided an optical information recording medium in which digital information is recorded by forming a track composed of a pit or a mark. This optical information recording medium is characterized in that first digital information is recorded by changing a length or interval of the pit or mark so as to obtain a reproduced signal which changes at an integral multiple period of a predetermined fundamental period and second digital information other than the first digital information is recorded by moving a front edge or a rear edge of the pit or mark from a position determined by the first digital information.

According to a fourth aspect of the present invention, there is provided an optical information reproducing apparatus for reproducing digital information from the optical information recording medium based on an output of an optical reading device responsive to a reflected light amount of an optical information recording medium. This optical information reproducing apparatus comprises a binary value generating circuit for generating an output of the optical reading means in the form of binary value, a clock generating circuit for generating a clock signal based on an output from the binary value generating circuit, a first decoding circuit for decoding first digital information based on an output from the binary value generating circuit, and a second decoding circuit for decoding second digital information other than the first digital information based on an output from the optical reading device, the clock signal and an output from the binary value generating circuit, wherein the second decoding circuit includes a change point position detecting circuit for detecting a time fluctuation of a change point of an output from the binary value generating circuit and an averaging circuit for averaging outputs of the change point position detecting circuit.

According to the optical information recording apparatus and the optical information recording method of the present invention, when ordinary user information is recorded on the optical information recording medium as first digital information, a double modulation signal is generated by further modulating the first modulation signal, which is generated by switching a signal level at an integral multiple period of a predetermined fundamental period in response to this ordinary information, in response to second digital information (e.g. identification code for identifying the optical information recording medium). Recording light is modulated in accordance with the double modulation signal, whereby the identification code is recorded within an ordinary information recording area together with the ordinary information. Accordingly, only by adding a simple hardware to a conventional recording apparatus and only by simply modifying a conventional recording method, the identification code may be recorded within the ordinary information recording area together with the ordinary information without modifying a disc manufacturing factory and the like at all.

According to the optical information recording medium of the present invention, while the ordinary information is recorded on the optical information recording medium by changing a length or an interval of a pit or a mark on the track so as to obtain a reproducing signal which changes at an integral multiple period of a predetermined fundamental period, the identification code is recorded on the optical information recording medium by moving a front edge or a rear edge of the pit or the mark from a position determined by the ordinary information. Therefore, even when a user intends to make an illegal copy by physically copying a pit shape or the like of this optical information recording medium (genuine optical information recording medium), it is difficult to accurately copy the position of the front edge or the rear edge of the pit or the mark. Also, when a user intends to make an illegal copy based on an audio signal reproduced from this genuine optical information recording medium, according to the conventional recording apparatus and the conventional recording method, it is not possible to move the position of the front edge or the rear edge of the pit or the mark in response to the identification code. Therefore, it is not possible to produce an optical information recording medium in which the position of the front edge or the rear edge of the pit or the mark accurately agrees with that of the genuine optical information recording medium. Therefore, it is possible to prevent an illegal copy which accurately agrees with the genuine optical information recording medium from being produced. Ordinary information may be reproduced from this optical information recording medium by using a conventional reproducing apparatus without modifications. Then, it becomes possible to reproduce the identification code from this optical information recording medium by only adding a simple hardware to the conventional reproducing apparatus. Furthermore, when a moved amount of the position of the front edge or the rear edge of individual pits is very small, it becomes possible to reproduce ordinary information without being affected by the movement of this position.

Then, according to the optical information reproducing apparatus of the present invention, while ordinary information is decoded based on a binary signal of an output from an optical reading device, an identification code is decoded by averaging time fluctuations of changing points of this binary signal based on the output from the optical reading device, this binary signal and a clock signal generated based on this binary signal. Accordingly, by only adding a simple hardware to a conventional reproducing apparatus, it is possible to stably reproduce an identification code that was recorded as a very small moved amount of a position of a front edge or the rear edge of a large number of pits or marks. Furthermore, since such identification code is not reproduced from an optical information recording medium produced according to the illegal copy, when the identification code is not reproduced, it becomes possible to exclude an illegal copy by stopping the reproduction of ordinary information, for example.

BRIEF DESCRIPTION OF THE DRAWINGS

FIGS. 8A to 8E are timing charts showing timings of signals developed at respective portions of the disc identification code decoding circuit shown in FIG. 7.

DESCRIPTION OF THE PREFERRED EMBODIMENT

An embodiment of the present invention will hereinafter be described with reference to the accompanying drawings. In this embodiment, a compact disc (CD) will be explained below as an example of an optical information recording medium. As is well-known, a compact disc is made in such a manner that a stamper is used as metal mold, a disc base is produced by molding a substrate material(plastics) according to a suitable method such as an injection molding and a reflection film and a protection film are formed on this disc base, The stamper is made by the following process. Initially, at the same time recording laser beam is focused on a disc master (disc-like glass plate with a photoresist coated/dried thereon), a focused position is moved at a constant pitch in the radius direction of the disc master while the disc master is being rotated in the circumference direction (cutting). Thus, a latent image of spiral-like tracks composed of pits is formed on the photoresist. Then, after the photoresist was developed, a mother disc is made by electroforming an nickel on the disc master. Then, by releasing the nickel layer from the mother disc, there is formed a stamper to which a track pattern on the mother disc is transferred.

Figure 1:
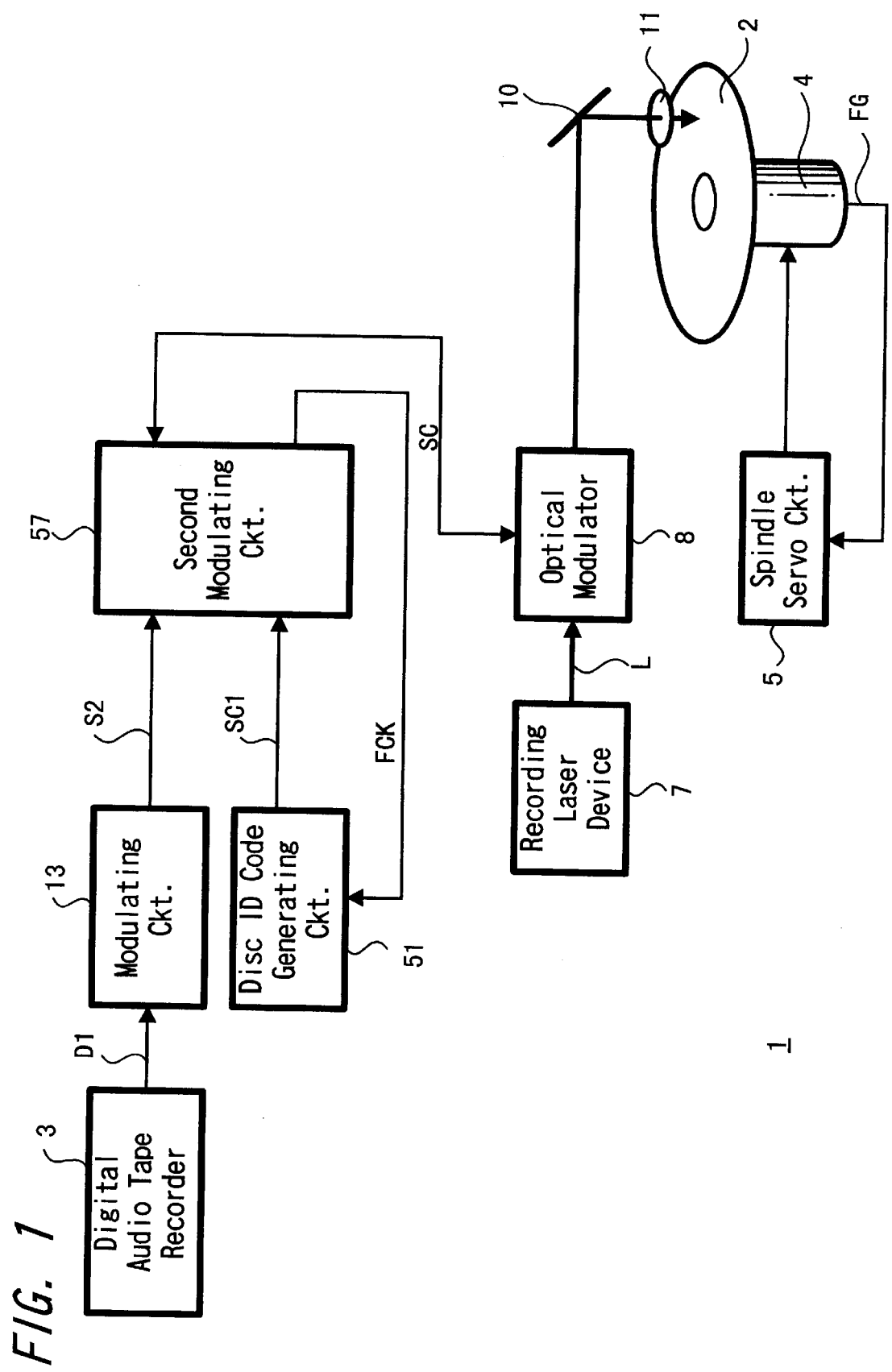
FIG. 1 is a block diagram showing an optical disc recording apparatus according to an embodiment of the present invention.

FIG. 1 of the accompanying drawings shows an example of an optical disc recording apparatus for use in cutting a disc master in the above-mentioned process. A disc master 2 is rotated by a spindle motor 4. The spindle motor 4 is driven under control of a spindle servo circuit 5.

The spindle motor 4 has on its bottom disposed an FG signal generator (not shown). This FG signal generator outputs an FG signal whose signal level rises at every predetermined rotation angle. The spindle servo circuit 5 drives the spindle motor 4 in such a manner that a frequency of this FG signal reaches a predetermined frequency, thereby resulting in the disc master 2 being rotated at a predetermined velocity (e.g. constant linear velocity).

A recording laser device 7 emits a laser beam L to an optical modulator 8. This recording laser device 7 is comprised of a gas laser device or the like, for example. The optical modulator 8 is comprised of an electroacoustic optical element or the like, and turns on/off the irradiation of the laser beam L incident thereon from the recording laser device 7 in response to a second modulation signal SC supplied from a second modulating circuit 57.

A mirror 10 turns its light path toward the disc master 2 by reflecting the laser beam L traveled from the optical modulator 8. An objective lens 11 focuses reflected light from this mirror 10 on the recording surface of the disc master 2. The mirror 10 and the objective lens 11 are translated in the radius direction by a sled mechanism (not shown) in synchronism with the rotation of the disc master 2.

When the focused position of the laser beam L is translated at a constant pitch in the outer peripheral direction of the disc master 2, for example, by this sled mechanism, a latent image of spiral-like track composed of pits corresponding to the second modulation signal SC is formed on the disc master 2.

A digital audio tape recorder 3 supplies audio data D1, which is to be recorded on the disc master 2, to a modulating circuit 13. To the modulator 13 is supplied sub-code data containing TOC (table of contents) corresponding to the audio data D1 from a sub-code generator (not shown).

The modulating circuit 13 generates an EFM (eight-to-fourteen modulation) signal by data processing conforming to the format of compact disc. Specifically, the modulating circuit 13 adds error-correction codes to the audio data D1 and the sub-code data, interleaved the resultant audio data D2 and sub-code data and then EFM-modulates the interleaved data, thereby generating the EFM signal S2.

The conventional optical disc recording apparatus that have been heretofore used to cut the disc master are adapted to record only ordinary information such as audio data and sub-code data on the disc master by turning on and off the irradiation of the laser beam L with this EFM signal S2 (i.e. form the latent image of the track composed of pits corresponding to the EFM signal S2).

The optical disc recording apparatus according to this invention is able to record a disc identification code on an ordinary information recording area together with ordinary information as will be described later on. To this end, a disc identification code SC1 generated from a disc identification code generating circuit 51 is supplied to a second modulating circuit 57 together with the EFM signal S2. The disc identification code SC1 is a signal representing a disc identification code comprising ID information inherent in each disc master, manufacturer information, manufacturing place (factory) information, and manufacturing date information or copy control information for allowing copy/inhibiting copy and the like.

The second modulating circuit 57 generates a second modulation signal SC by superimposing the disc identification code SC1 on the EFM signal S2, and supplies this second modulation signal SC to the optical modulator 8. Accordingly, the laser beam L is turned on/off in accordance with a signal which results from superimposing the disc identification code SC1 upon the EFM signal S2. As will be described later on, the disc identification code SC1 is superimposed upon the EFM signal S2 so as not to spoil ordinary information recorded by the EFM signal S2.

Figure 2:
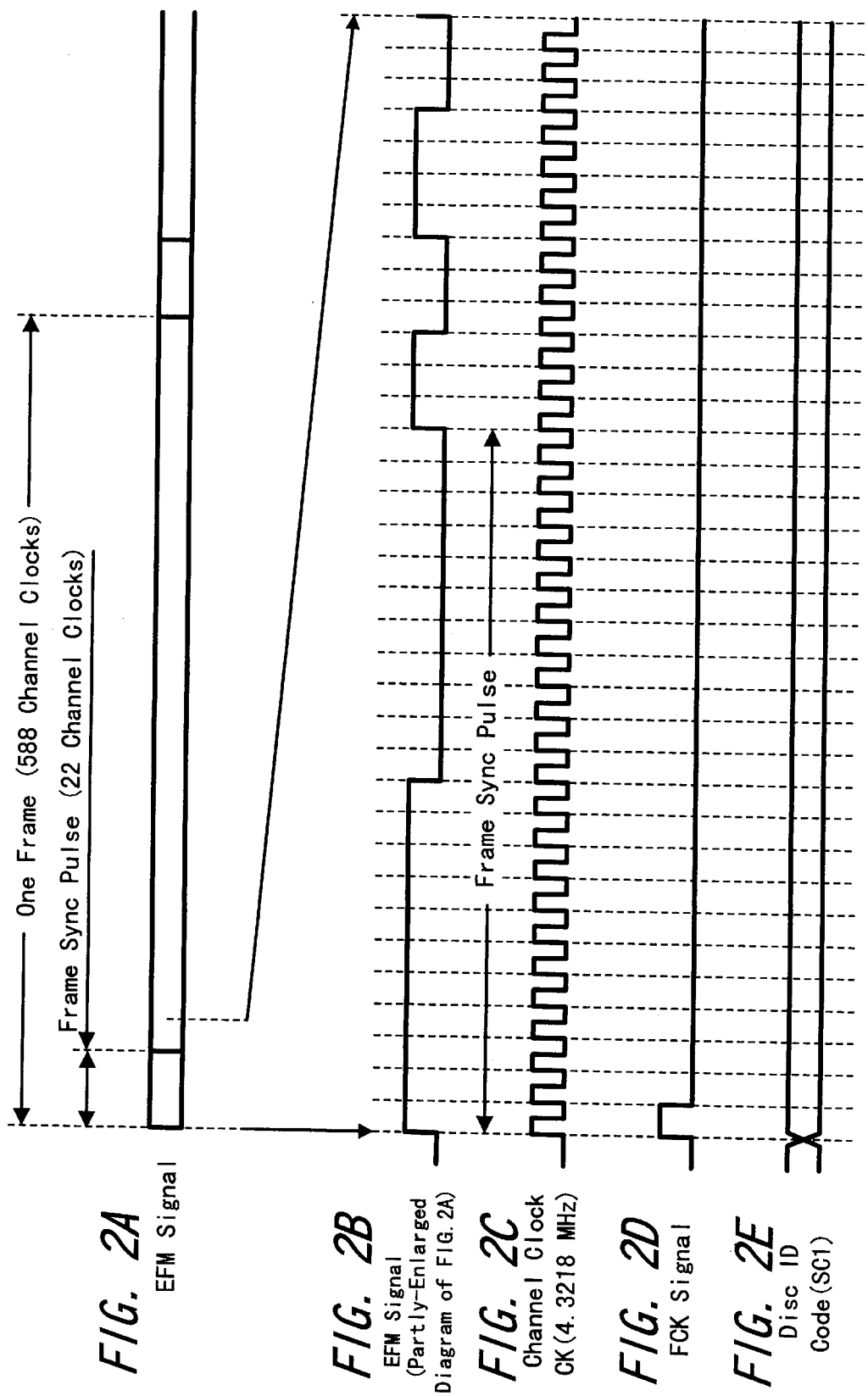
FIGS. 2A to 2E are timing charts showing timings of signals developed at respective portions of the optical disc recording apparatus shown in FIG. 1.

The second modulating circuit 57 generates a frame clock FCK and supplies the same to the disc code identification code generating circuit 51 in addition to the second modulation signal SC. As shown in FIGS. 2A to 2C, a frame synchronizing (sync) pulse of 22 channel clocks is inserted into the EFM signal S2 at every frame (duration of 588 channel clocks of channel clock CK having a frequency of 4.3218 MHz) of the compact disc. A frame clock FCK is a low-speed clock signal which generates one pulse at every frame sync pulse as shown in FIG. 2D. The disc identification code generating circuit 51 generates the disc identification code SC1 in synchronism with the frame cock FCK bit by bit as shown in FIG. 2E. Accordingly, the disc identification code SC1 represents information of one bit at every frame. The reason that the disc identification code SC1 is generated in the form of a frame unit signal is to simplify an arrangement of an optical disc reproducing apparatus which will be described later on.

Further, in the optical disc reproducing apparatus which will be described later on, the disc identification code is decoded from only a polarity inverted portion of a reproduced signal (portion in which the reproduced signal changes from 0 to 1 when the focused position of the reproducing laser beam is changed from the pit to the space portion between adjacent pits or changed from the space portion to the pit). As is well-known, in the EFM modulation, a signal whose polarity is inverted in a range of periods 3 T to 1 T is generated with respect to a predetermined period T(channel clock CK has a period 1/4.3218 MHz Å‡ 231 nsec). Accordingly, during one frame which is a period for identifying a disc identification code of one bit, the polarity of the reproduced signal is inverted at least more than 588 ? 11 Å‡ 53 times. Since the disc identification code of one bit is decoded in a number of polarity inverted portions as described above, the optical disc reproducing apparatus becomes possible to decode the disc identification code with a sufficient S/N (signal-to-noise ratio).

Figure 3:
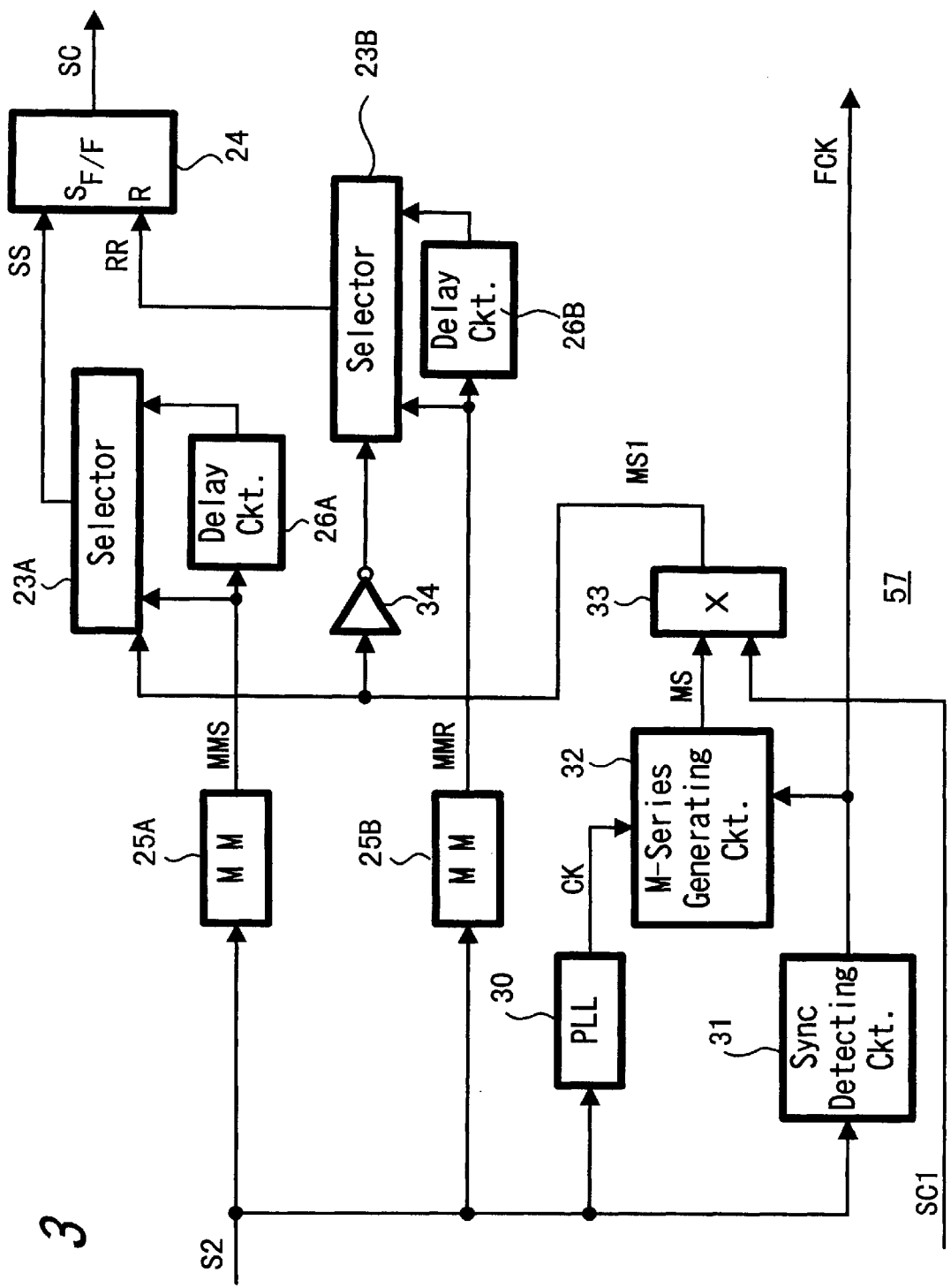
FIG. 3 is a block diagram showing an example of a second modulating circuit shown in FIG. 1.

FIG. 3 shows an example of the second modulating circuit 57. FIGS. 4A to 4J are timing charts showing an example of a relationship of timings of the signals developed at the respective portions of the second modulating circuit 57. Referring to FIG. 3, the EFM signal S2 supplied to the second modulating circuit 57 is inputted to monostable multivibrators (MM) 25A and 25B. The monostable multivibrator 25A outputs a leading edge detection pulse MMS (see FIGS. 4A, 4C) by detecting the leading edge of the EFM signal S2. The monostable multivibrator 25B outputs a trailing edge detection pulse MMR (see FIGS. 4A, 4D) by detecting the trailing edge of the EFM signal S2. The leading edge detection pulse MMS is supplied to one selection input terminal of a data selector 23A and supplied through a delay circuit 26A having a predetermined delay time (about 5 nsec by way of example) to another selection input terminal of the data selector 23A. The trailing edge detection pulse MMR is supplied to one selection input terminal of the data selector 23B and supplied through a delay circuit 26B having a predetermined delay time (about 5 nsec by way of example) to another selection input terminal of the data selector 23B. A control signal MS1 (signal which results from encrypting the disc identification code SC1 by an M-series code MS as will be described later on) is supplied from an exclusive-OR circuit 33 to the data selector 23A so that, when the value of the control signal MS1 is "1", the data selector 23A selects the leading edge detection pulse MMS delayed by the delay circuit 26A and outputs the selected leading edge detection pulse MMS as the leading edge pulse SS and that, when the value of the control signal is "0", the data selector 23A selects the leading edge detection pulse MMS, which is not delayed, from the monostable multivibrator 25A and outputs the thus selected leading edge detection pulse MMS as the leading edge pulse SS (see FIGS. 4C, 4G and 4H). A signal which results from inverting the control signal MS1 by an inverter 34 is supplied to the data selector 23B as a selection control signal so that, when the value of the inverted signal is "1" (i.e. when the value of the control signal MS1 is "0"), the data selector 23B selects the trailing edge detection pulse MMR delayed by the delay circuit 26B and outputs the selected trailing edge detection pulse MMR as a trailing edge pulse RR and that, when the value of the inverted signal is "0" (i.e. when the value of the control signal is "1"), the data selector 23B selects the trailing edge detection pulse MMR, which is not delayed, from the monostable multivibrator 25B and outputs the thus selected trailing edge detection pulse MMR as the trailing edge pulse RR (see FIGS. 4D, 4G and 4I).

Of the leading edge and the trailing edge of the EFM signal, the portion designated by the control signal MS1 is delayed as described above, thereby forming the leading edge pulse SS and the trailing edge pulse RR. These leading edge pulse SS and trailing edge pulse RR are rearranged into the EFM signal by a set-reset flip-flop (F/F) 24. Specifically, the leading edge pulse SS is inputted to a set input terminal S of the set-reset flip-flop 24m and the trailing edge pulse RR is inputted to a reset input terminal R of the set-reset flip-flop 24. Thus, the set-reset flip-flop 24 outputs signal SC (see FIGS. 4H to 4J) whose level rises at the leading edge of the leading edge pulse SS and whose level falls at the trailing edge of the trailing edge pulse RR. While the thus rearranged EFM signal (second modulation signal) SC has substantially the same waveform as that of the EFM signal S2, the edge thereof designated by the control signal MS1 is delayed.

As mentioned before, while the leading edge pulse SS is delayed when the value of the control signal MS1 is "1", the trailing edge pulse RR is delayed when the value of the control signal MS1 is "0". The reason that the delay processing for the leading edge pulse SS and the delay processing for the trailing edge pulse RR are made opposite to each other is to enable the optical disc reproducing apparatus, which will be described later on, to decode the disc identification code without discriminating the leading edge and the trailing edge of the reproduced signal.

The exclusive-OR circuit 33 encrypts the disc identification code SC1 by using an M-series code (maximum length-series code) MS from an M-series generating circuit 32 and outputs the thus encrypted disc identification code as the control signal MS1. The M-series generating circuit 32 generates the M-series code MS at the unit of channel clock CK (see FIG. 2C and FIG. 4B) which is generated from a PLL (phase-locked loop) circuit 30 based on the EFM signal s2, and initialized by a sync pattern detection output signal FCK (see FIG. 2D) of the EFM signal S2 from a sync detecting circuit 31. As a consequence, the M-series code MS becomes a signal which repeats the same pattern at a period of one frame (588 channel clocks). Although the M-series generating circuit 32 is comprised of a plurality of flip-flops and exclusive-OR circuits, its arrangement and operation are well-known, and therefore need not be described in detail.

Figure 4:
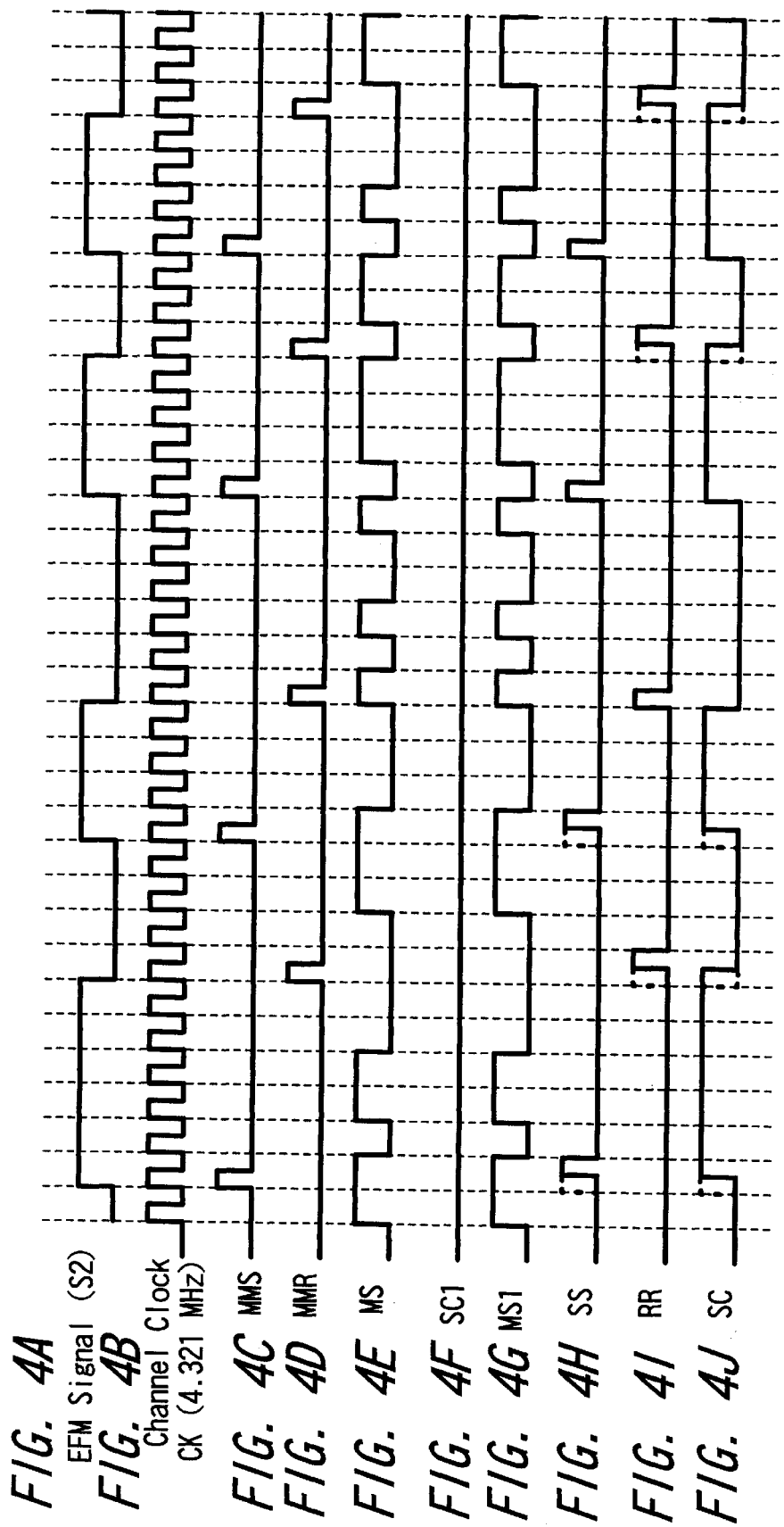
FIGS. 4A to 4J are timing charts showing timings of signals developed at respective portions of the second modulating circuit shown in FIG. 3.

An edge of the second modulation signal SC thus obtained is partly delayed as shown in FIG. 4J. Specifically, the leading edge of the signal SC is delayed if the disc identification code SC1 is "0" when the M-series code MS is "0", and delayed if the disc identification code SC1 is "1" when the M-series code MS is 0. On the other hand, the trailing edge of the signal SC is delayed if the disc identification code SC1 is "0" when the M-series code MS is "0", and delayed if the disc identification code SC is "1" when the M-series code MS1 is "1". In other words, the disc identification code SC1 encrypted by the M-series code MS is represented as a time shift of edge of the signal SC. The optical disc reproducing apparatus, which will be described later on, reproduces the compact disc recorded according to the above-mentioned method and decodes the disc identification code SC1 by sampling the amplitude of the polarity inverted portion of a reproduced RF signal at a timing of a clock signal generated based on the reproduced RF signal.

As described before, the edge delay amount of the signal SC for expressing the disc identification code is set to be an amount as extremely small as 5 nsec. Having considered that the fundamental period T (period of the channel clock CK) of the compact disc is about 231 nsec as mentioned before, it is to be understood that a time fluctuation of this value sufficiently falls within a range of allowable error and does not affect the decoding of ordinary information such as audio data at all. Moreover, converting the time of 5 nsec into a movement amount of a position of an edge of pit on the disc, it is to be understood that such movement amount is an amount as very small as 6 nm when audio data is recorded at a linear velocity of 1.2 m/sec. In addition, although individual delay amounts are very small, since the data identification code of one bit is expressed as delay amounts of a number of edges in one frame, the optical disc reproducing apparatus becomes able to decode the disc identification code with a satisfactory S/N as mentioned before.

The optical modulator 8 turns on/off the laser beam L in accordance with the above-mentioned second modulation signal SC, whereby audio data and sub-code data are recorded on the disc master 2 by changing the length or the interval of the pit and also the disc identification code is recorded on the audio data and sub-code data recording area by moving the position of the front edge or the rear edge of the pit from the position determined by the audio data and the sub-code data. Accordingly, also in the compact disc produced from this disc master through the process for making the mother disc and the stamper, a disc identification code is recorded on the audio data and sub-code data recording area in exactly the same manner.

Figure 5:
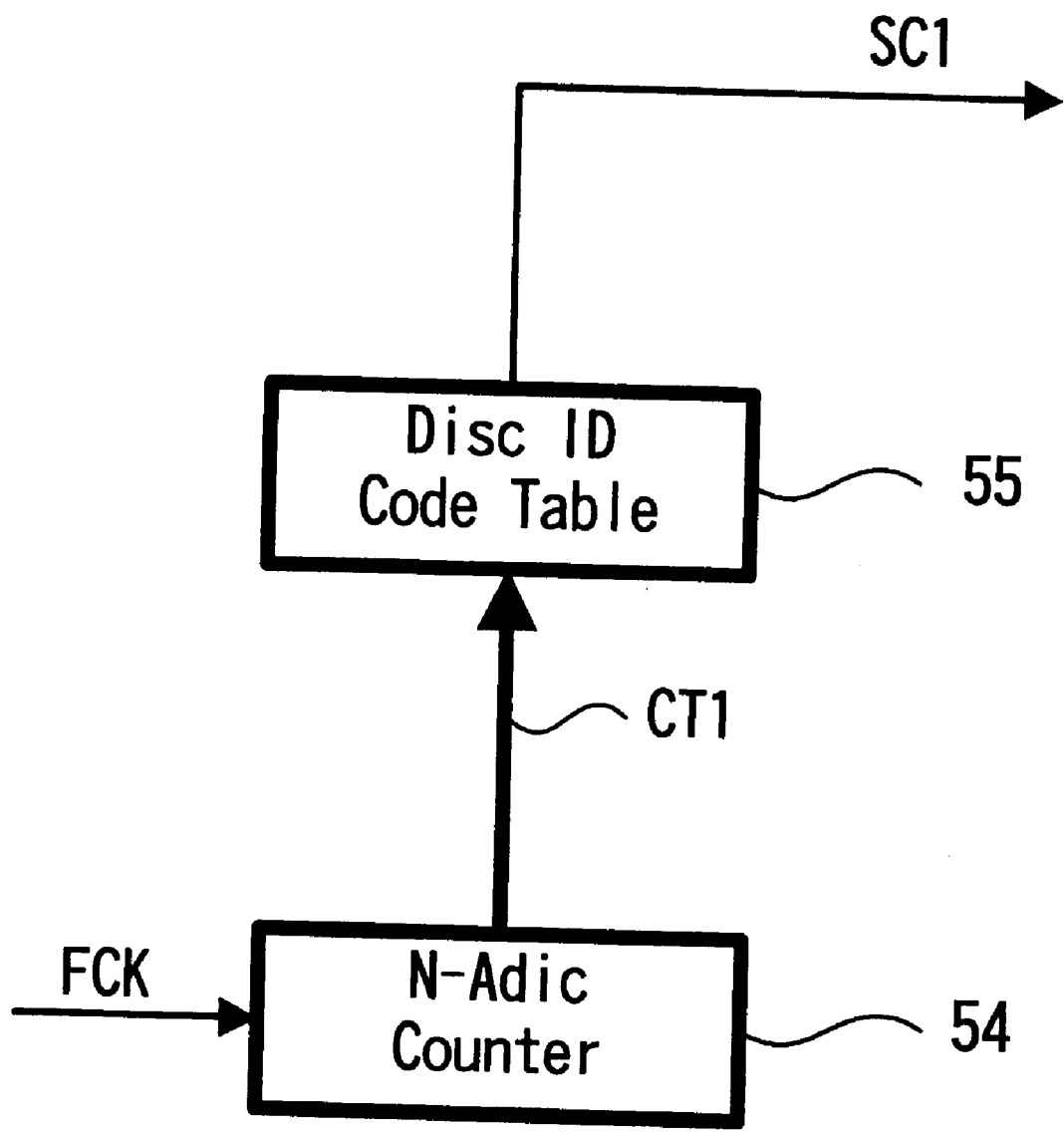
FIG. 5 is a block diagram showing an example of a disc identification code generating circuit shown in FIG. 1.

FIG. 5 shows an example of the disc identification code generating circuit 51. The frame clock FCK supplied from the second modulating circuit 57 is counted by an N-adic counter 54 using a ring counter, and its count value signal CT1 is inputted to a disc identification code table 55.

The disc identification code table 55 comprises a ROM (read-only memory) in which bit information is stored, and outputs bit information in response to the count value signal CT1 inputted to its address. This bit information contains, in addition to the disc identification code itself, a sync signal representing the beginning of the disc identification code, information for correcting errors caused in the disc identification code or the like.

Figure 6:
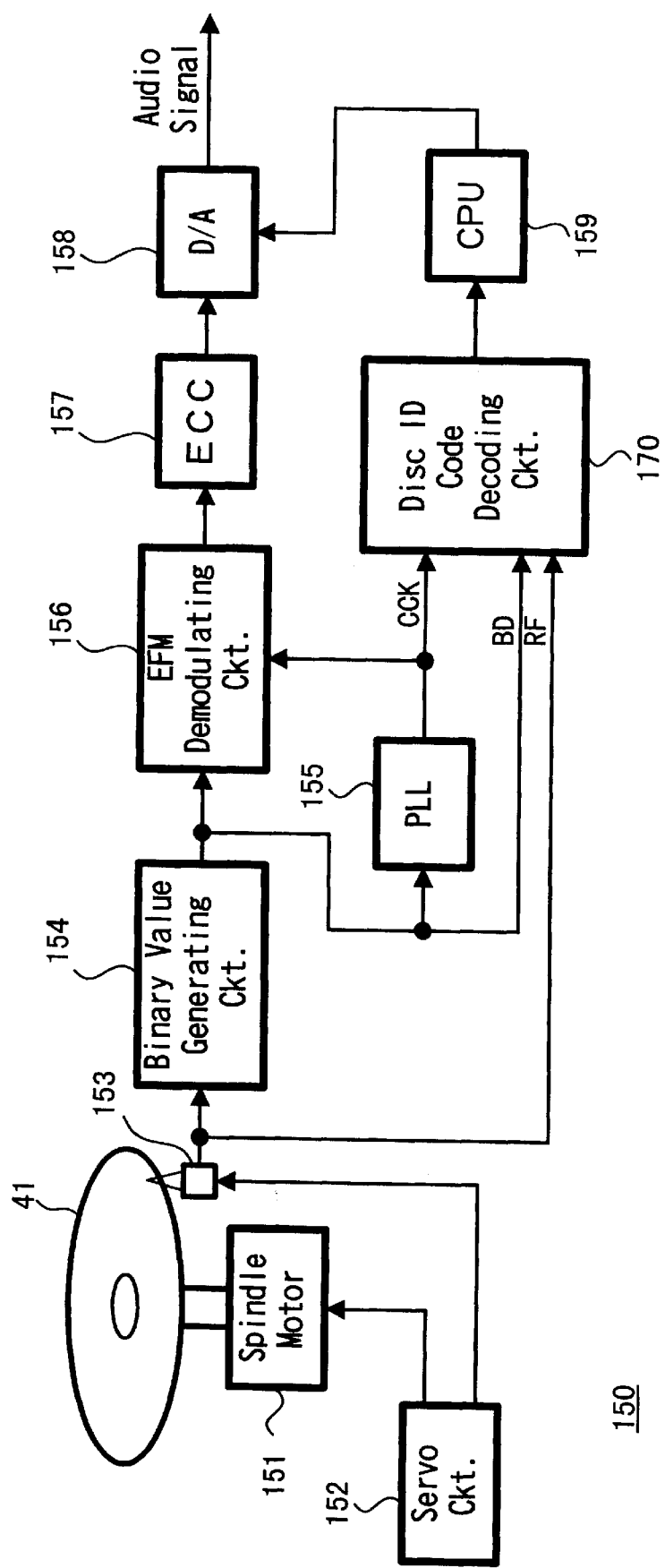
FIG. 6 is a block diagram showing an optical disc reproducing apparatus according to an embodiment of the present invention.

An optical disc reproducing apparatus 150 for playing back a compact disc on which data were recorded as described above will be described with reference to FIGS. 6 to 8. As shown in FIG. 6, a spindle motor 151 rotates the compact disc 41 at a predetermined velocity (e.g. constant linear velocity) under control of a servo circuit 152. An optical pickup 153 irradiates the compact disc 4 with reproducing laser beams under tracking control and focusing control effected by the servo circuit 152, and generates a reproducing RF signal of the level corresponding to an amount of reflected light. This reproducing RF signal is supplied to a binary value generating circuit 154 and a disc identification code decoding circuit 170.

The binary value generating circuit 154 waveform-equalizes this reproducing RF signal and converts the waveform-equalized reproducing RF signal into a binary signal BD of 1 or 2 (see FIGS. 8A, 8B) by comparing its signal level with a predetermined slice level. This binary signal BD is supplied to an EFM demodulating circuit 156, a PLL unit 155 and a disc identification code decoding circuit 170. The EFM demodulating circuit 156 demodulates the binary signal BD to generate a signal of 8-bit unit, and supplies the thus generated signal of 8-bit unit to an ECC (error correction code) circuit 157.

The ECC circuit 157 de-interleaves a signal supplied from the EFM demodulating circuit 156 and corrects an error of such code based on an error-correction code added to that signal. Such error of code is caused by scratches on the compact disc 41 or the like, for example. An output signal from the ECC circuit 157 is converted into an analog audio signal by a D/A (digital-to-analog) converter 158.

The PLL unit 155 generates a channel clock CCK (see FIG. 8C) based on the binary signal BD. This channel clock CCK is supplied to the EFM demodulating circuit 156 and the disc identification code decoding circuit 170, thereby instructing operation timings of these circuits 156 and 170.

On the other hand, the disc identification code decoding circuit 170 decodes a disc identification code based on the three signals supplied thereto, i.e. the channel clock CCK, the binary signal BD and the reproducing RF signal. The disc identification code thus decoded is supplied to a CPU (central processing unit) 159 of a microcomputer which controls the operation of the whole of the optical disc reproducing apparatus 150. When a correct disc identification code, for example, is not supplied, the CPU 159 judges that the compact disc 41 is the illegal copy compact disc, and stops the reproduction of the audio signal by interrupting the supply of an enable signal to the D/A converter 158 which converts the output signal of the ECC circuit 157 into the analog signal.

Figure 7:
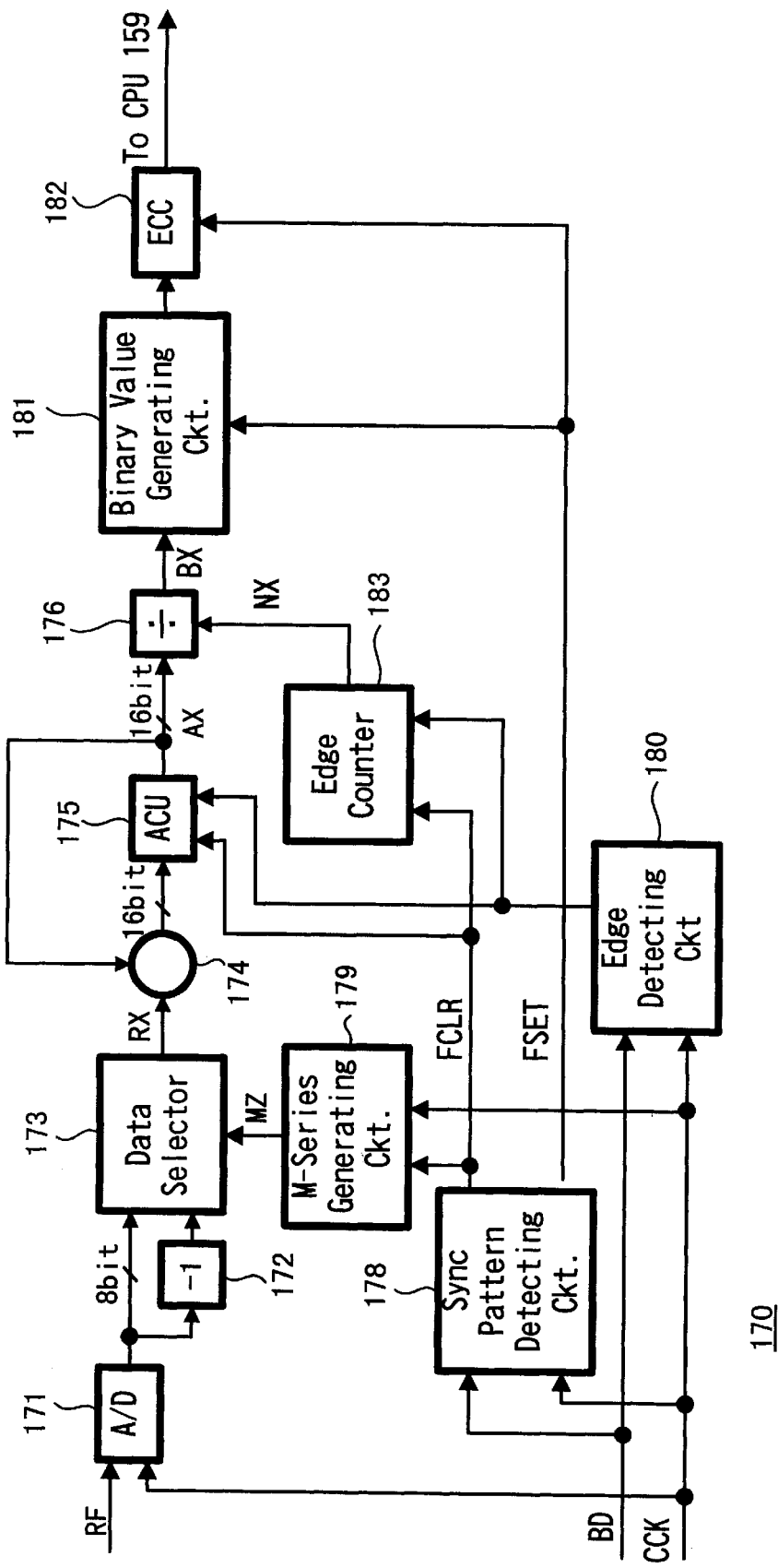
FIG. 7 is a block diagram showing a disc identification code decoding circuit shown in FIG. 6.

FIG. 7 is a block diagram showing an example of the disc identification code decoding circuit 170. An A/D (analog-to-digital) converter 171 converts the reproducing RF signal into an 8-bit digital RF signal at a timing determined by the channel clock CCK. This digital RF signal is supplied to one selection input terminal of a data selector 173, and also inverted in polarity by a polarity inverting circuit 172 and then delivered to another selection input terminal of the data selector 173. The data selector 173 selects a signal by using an M-series code MZ decoded by an M-series generating circuit 179 as a selection control signal. That is, the data selector 173 selects the digital RF signal whose polarity is not inverted and which is supplied from the A/D converter 171 when the value of the M-series code MZ is "1", and selects the digital RF signal whose polarity is inverted by the polarity inverting circuit 172 when the value of the M-series code MZ is "0". In this manner, the data selector 173 computes a product of the M-series code MZ and the digital RF signal. An output signal representing a product RX from the data selector 173 is added to an output signal from an accumulator 175 by an adder 174 as will be described later on.

A sync pattern detecting circuit 178 detects a frame sync pulse (see FIGS. 8A, 8B) of every frame from the binary signal BD and the channel clock CCK, outputs one pulse of a set pulse FSET at the beginning of each frame and outputs a clear pulse FCLR after a very small delay time (see FIGS. 8E, 8D). The clear pulse FCLR is supplied to the M-series generating circuit 179, the accumulator 175 and an edge counter 183, and the set pulse FSET is supplied to a binary value generating circuit 181 and an ECC circuit 182. The edge detecting circuit 180 detects both of the leading edge portion and the trailing edge portion of the reproducing RF signal from the binary signal BD and the channel clock CCK. An edge detection signal outputted from the edge detecting circuit 180 is supplied to the accumulator 175 and the edge counter 183.

The adder 174 is a 16-bit digital adder, and adds the output value RX of the data selector 173 and the output value of the accumulator 175. The accumulator 175 comprises a 16-bit memory, and outputs a signal representing a value AX stored in the memory. Also, the accumulator 175 replaces the value AX thus stored so far with an added result of the adder 174 at a timing at which the edge detection signal is supplied from the edge detecting circuit 180. That is, each time the polarity of the reproducing RF signal is inverted, the accumulator 175 computes AX=AX+RX. Further, the accumulator 175 clears the value AX thus stored so far when the clear pulse FCLR is supplied thereto from the sync pattern detecting circuit 178.

Accordingly, the output signal from the accumulator 175 represents an accumulated value of amplitudes at the edge portion (polarity changed portion) of the reproducing RF signal over immediately-preceding one frame (588 channel clocks) when observed at a timing at which the set pulse signal FSET is generated from the sync pattern detecting circuit 178.

The edge counter 183 increments a count value NX one by one at a timing at which the edge signal is supplied from the edge detecting circuit 180. When the clear pulse is supplied from the sync pattern detecting circuit 178, the edge counter 183 clears the count value NX thus held so far. Accordingly, an output signal of the edge counter 183 and which represents this count value NX represents the number of edges of the reproducing RF signal in the immediately-preceding frame (i.e. the number in which the amplitude of the reproducing RF signal is accumulated in the immediately-preceding frame) when observed at the timing in which the set pulse signal FSET is generated from the sync pattern detecting circuit.

A digital divider 176 divides the output value of the accumulator 175 by an output value of the edge counter 183. Accordingly, a digital signal BX outputted from the digital divider 176 represents an average value of amplitudes at the polarity changed portions of the reproducing RF signal over the immediately-preceding frame when observed at the timing in which the set pulse signal FSET is generated from the sync pattern detecting circuit 178. This average value reflects the moved amount of the position of the front edge or the rear edge of the pit on the disc 41 in the corresponding frame (accordingly, the disc identification code SC1 in the corresponding frame).

The digital signal BX, which is obtained as the average value of the amplitudes at a large number of polarity changed portions, is not affected by a random noise included in the reproduced RF signal too much. Accordingly, even though the moved amount of the position of the front edge or the rear edge of individual pit is very small as mentioned before, it is possible to decode the disc identification code with a sufficient S/N based on the digital signal BX. In addition, since the moved amount of the position of the front edge or the rear edge of the individual pit is very small (within a range of allowable error), ordinary information such as audio data may be decoded without being affected by the movement of the position at all.

The binary value generating circuit 181 converts this digital signal BX into a binary signal of 1 or 0 by comparing this digital signal BX with a predetermined slice level at every timing in which the set signal FSET is supplied from the sync pattern detecting circuit 178 (i.e. immediately before the accumulator 175 and the edge counter 183 are cleared by the clear pulse FCLR). If the compact disc 41 is a genuine compact disc (not illegal copy compact disc), then this binary signal agrees with the disc identification code SC1 recorded when the compact disc 41 is manufactured except the errors of the code.

The ECC circuit 182 corrects error of the code based on the error-correction code added to this binary signal. An output signal from this ECC circuit 182 is supplied to the CPU 159 as a disc identification code that is decoded finally.

While the present invention is applied to the recording apparatus/reproducing apparatus using the EFM as a modulation system for audio data or the like as described above, the present invention is not limited thereto, and may be similarly applied to recording apparatus/reproducing apparatus using most of modulation systems such as 1-7 modulation, 8-16 modulation and 2-7 modulation.

While the EFM signal is modulated by delaying the edge (i.e. the timing of the level change of the EFM signal is modulated) as described above, the present invention is not limited thereto, and the EFM signal may be modulated by a proper method such as fluctuating the output of the recording laser beam.

While the disc identification code is recorded on the audio data recording area as the moved amount of the position of the front edge or the rear edge of the pit as described above, the present invention is not limited thereto, and the disc identification code may be recorded on a TOC recording area as the moved amount of the position of the front edge or the rear edge of the pit.

While the present invention is applied to the recording apparatus/reproducing apparatus which encrypts the disc identification code by the M-series code as described above, the present invention is not limited thereto, and may be similarly applied to a recording apparatus/reproducing apparatus which encrypts the disc identification code by a signal of series other than the M-series code. Further, when the present invention is applied to a recording apparatus/reproducing apparatus which encrypts the disc identification code, a signal used in the encryption may be recorded/reproduced as the moved amount of the position of the front edge or the rear edge of the pit.

While it is judged based on only the disc identification code encrypted by the M-series code and which is recorded as the moved amount of the position of the front edge or the rear edge of the pit whether or not the compact disc is the illegal copy compact disc as described above, the present invention is not limited thereto, and it may be determined by various methods whether or not the compact disc is the illegal copy compact disc, i.e. it may be determined by code verification of the disc identification code with a disc identification code recorded by a proper method whether or not the compact disc is the illegal copy compact disc or it may be determined by verifying the disc identification code with a disc identification code encrypted by a signal of series other than the M-series code whether or not the compact disc is the illegal copy compact disc.

Furthermore, while the present invention is applied to the compact disc recording apparatus/reproducing apparatus as described above, the present invention is not limited thereto, and may be similarly applied to a variety of optical discs in which information is recorded by pits and a magnetooptical disc in which information is recorded by marks and the like.

As described above, according to the optical information recording apparatus and the optical information recording method of the present invention, when ordinary user information is recorded on the optical information recording medium as first digital information, a double modulation signal is generated by further modulating the first modulation signal, which is generated by switching a signal level at an integral multiple period of a predetermined fundamental period in response to this ordinary information, in response to second digital information (e.g. identification code for identifying the optical information recording medium). Then, recording light is modulated in accordance with the double modulation signal, whereby the identification code is recorded within an ordinary information recording area together with the ordinary information. Accordingly, only by adding a simple hardware to a conventional recording apparatus and only by simply modifying a conventional recording method, the identification code may be recorded within the ordinary information recording area together with the ordinary information without modifying a disc manufacturing factory and the like at all.

Then, according to the optical information recording medium of the present invention, while the ordinary information is recorded on the optical information recording medium by changing a length or an interval of a pit or a mark on the track so as to obtain a reproducing signal which changes at an integral multiple period of a predetermined fundamental period, the identification code is recorded on the optical information recording medium by moving a front edge or a rear edge of the pit or the mark from a position determined by the ordinary information. Therefore, even when a user intends to make an illegal copy by physically copying a pit shape or the like of this optical information recording medium (genuine optical information recording medium), it is difficult to accurately copy the position of the front edge or the rear edge of the pit or the mark. On the other hand, when a user intends to make an illegal copy based on an audio signal or the like reproduced from this genuine optical information recording medium, according to the conventional recording apparatus and the conventional recording method, it is not possible to move the position of the front edge or the rear edge of the pit or the mark in response to the identification code. Therefore, it is not possible to produce an optical information recording medium in which the position of the front edge or the rear edge of the pit or the mark accurately agrees with that of the genuine optical information recording medium. Therefore, it is possible to prevent an illegal copy which accurately agrees with the genuine optical information recording medium from being produced. Ordinary information may be reproduced from this optical information recording medium by using a conventional reproducing apparatus without modifications. Then, it becomes possible to reproduce the identification code from this optical information recording medium by only adding a simple hardware to the conventional reproducing apparatus. Furthermore, when a moved amount of the position of the front edge or the rear edge of individual pit is very small, it becomes possible to reproduce ordinary information without being affected by the movement of this position.

Then, according to the optical information reproducing apparatus of the present invention, while ordinary information is decoded based on a binary signal of an output from an optical reading device, an identification code is decoded by averaging time fluctuations of changing points of this binary signal based on the output from the optical reading device, this binary signal and a clock signal generated based on this binary signal. Accordingly, by only adding a simple hardware to a conventional reproducing apparatus, it is possible to stably reproduce an identification code that was recorded as a very small moved amount of a position of a front edge or the rear edge of a large number of pits or marks. Furthermore, since such identification code is not reproduced from an optical information recording medium produced according to the illegal copy, when the identification code is not reproduced, it becomes possible to exclude an illegal copy by stopping the reproduction of ordinary information, for example.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. Optical information recording apparatus for recording digital information on an optical recording medium by irradiating said optical recording medium with a light beam and modulating said beam as a function of said information, comprising:
   a first signal generator for generating a pulse signal having its signal level switched at time occurrences that are an integral multiple of a predetermined fundamental period in response to first digital information;
   a second signal generator for shifting the time of occurrence of a signal level transition of said pulse signal in response to second digital information which differs from said first digital information; thereby producing a double modulation signal; and
   a light modulator for modulating said light beam in accordance with said double modulation signal.

2. Optical information recording apparatus as claimed in claim 1, wherein said pulse signal undergoes level transitions at respective times and wherein said second signal generator includes a timing modulator for modulating the time of occurrence at which a level transition occurs in said pulse signal.

3. Optical information recording apparatus as claimed in claim 2, wherein the time modulation of said level transition is limited to less than 10% of said fundamental period.

4. Optical information recording apparatus as claimed in claim 2, wherein said pulse signal exhibits multiple level transitions during a predetermined time duration; and wherein said timing modulator modulates the times at which at least 10 level transitions of said pulse signal occur in response to one bit of said second digital information.

5. Optical information recording apparatus as claimed in claim 2, wherein said second signal generator includes a source of said second digital information, a binary number-series code computing circuit for generating a predetermined binary number-series code, and an encoder for encoding said second digital information as a function of said binary number-series code to control said timing modulator in response to the encoded second digital information.

6. An optical information recording apparatus as claimed in claim 1, wherein said second digital information includes ID information for identifying the optical recording medium.

7. An optical information recording method for recording digital information on an optical recording medium by irradiating said optical recording medium with a light beam and modulating said light beam as a function of said information, comprising the steps of:
   generating a pulse signal by switching a signal level at time occurrences that are an integral multiple of a predetermined fundamental period in response to first digital information;
   generating a double modulation signal by shifting the time of occurrence of a signal level transition in said pulse signal in response to second digital information which differs from said first digital information; and
   modulating said light beam in accordance with said double modulation signal.

8. An optical information recording method as claimed in claim 7, wherein the shift in the time of occurrence of said signal level transition is limited to less than 10% of said fundamental period.

9. An optical information recording method as claimed in claim 7, wherein said pulse signal exhibits multiple level transitions during a predetermined time duration; and wherein at least 10 transitions in said pulse signal are time-shifted in response to one bit of said second digital information.

10. An optical information recording method as claimed in claim 7, wherein said step of generating a double modulation signal includes the steps of generating a predetermined binary number-series code and encoding said second digital information as a function of said binary number-series code to control the shifting in the time of occurrence of said signal level transition in said pulse signal.

11. An optical information recording apparatus as claimed in claim 7, wherein said second digital information includes ID information for identifying the optical recording medium.

12. An optical information recording medium having digital information recorded thereon in tracks formed of pits and marks, wherein the length of a pit or the length of a mark represents first digital information which, when reproduced from said medium, exhibits level transitions that occur at an integral multiple of a predetermined fundamental period, and the relative location of a leading edge or a trailing edge of a pit or a mark represents second digital information which differs from said first digital information.

13. An optical information recording medium as claimed in claim 12, wherein the location of said leading edge or trailing edge of said pit or mark is shifted relative to a predetermined location by an amount less than 10% of said fundamental period.

14. An optical information recording medium as claimed in claim 12, wherein the location of said leading edge or trailing edge of said pit or mark is shifted relative to a predetermined location by an amount less than 10 nm.

15. An optical information recording medium as claimed in claim 12, wherein said second digital information includes ID information for identifying the optical information recording medium.

16. Optical information reproducing apparatus for reproducing digital information from an optical recording medium including an optical reader for producing an output responsive to a light beam modulated with optical information recorded on said recording medium, said reproducing apparatus comprising:
   a binary value generator for generating a binary output in response to said optical reader output, said binary output having leading edge transitions and trailing edge transitions;
   a clock generator for generating a clock signal based on said binary output;
   a first decoder for decoding said binary output to recover first digital information; and
   a second decoder including a transition detector responsive to said optical reader output, said clock signal and said binary output for detecting a time shift in the occurrence of a leading edge or trailing edge transition of said binary output, and averaging means for averaging said detected time shifts to decode said binary output to recover therefrom second digital information which differs from said first digital information.

17. An optical information reproducing apparatus as claimed in claim 16, wherein said averaging means comprises accumulating means for accumulating outputs from said transition detector representing said time shifts, counting means for counting the number of accumulated outputs, and dividing means for dividing the value of said accumulated outputs by a count value of said counting means.

18. An optical information reproducing apparatus as claimed in claim 16, wherein said transition detector comprises sampling means for sampling transitions in said binary output to produce a sampled value, binary number-series code generating means for generating a predetermined binary number-series code, and multiplying means for multiplying said binary number-series code and the sampled value.

19. An optical information reproducing apparatus as claimed in claim 16, wherein said second digital information includes ID information for identifying the optical recording medium.

* * * * *